(12) United States Patent
McCarry

(10) Patent No.: US 10,054,212 B2
(45) Date of Patent: Aug. 21, 2018

(54) PLANETARY GEAR HUB ASSEMBLY

(71) Applicant: TECHNOLOGY INVESTMENTS LIMITED, County Meath (IE)

(72) Inventor: Desmond McCarry, Virginia County Cavan (IE)

(73) Assignee: TECHNOLOGY INVESTMENTS LIMITED, Johnstown, Navan, County Meath (IE)

( * ) Notice: Subject to any disclaimer, the term of this patent is extended or adjusted under 35 U.S.C. 154(b) by 0 days.

(21) Appl. No.: 15/101,532

(22) PCT Filed: Nov. 4, 2014

(86) PCT No.: PCT/EP2014/073721
§ 371 (c)(1),
(2) Date: Jun. 3, 2016

(87) PCT Pub. No.: WO2015/082157
PCT Pub. Date: Jun. 11, 2015

(65) Prior Publication Data
US 2017/0002918 A1 Jan. 5, 2017

(30) Foreign Application Priority Data
Dec. 6, 2013 (GB) .................................. 1321616.3

(51) Int. Cl.
*F16H 57/022* (2012.01)
*F16H 1/28* (2006.01)
(Continued)

(52) U.S. Cl.
CPC ......... *F16H 57/022* (2013.01); *B60K 17/046* (2013.01); *F16H 1/28* (2013.01);
(Continued)

(58) Field of Classification Search
None
See application file for complete search history.

(56) References Cited

U.S. PATENT DOCUMENTS

| 2,543,811 A | 3/1951 | Snow et al. |
| 3,686,918 A | 8/1972 | Knoblach et al. |

(Continued)

FOREIGN PATENT DOCUMENTS

| EP | 1053147 A1 | 11/2000 |
| WO | 99/41118 A1 | 8/1999 |

*Primary Examiner* — Colby M Hansen
(74) *Attorney, Agent, or Firm* — Tutunjian & Bitetto, P.C

(57) ABSTRACT

A planetary gear hub assembly (1) comprising a housing (2) with a planetary sun gear (3) rotabably mounted in the housing (2). The planetary sun gear (3) meshes with a set of planet gears (4) which also mesh with a ring gear (5). A thrust bearing (25) is mounted on an outer end cover (7) of the housing (2) for engagement by an outer end of the planetary sun gear (3). The thrust bearing (25) is formed by a wear pad (26) mounted on an inner face (27) of the end cover (7) and an associated wear plug (28) mounted in a central axial bore (29) at the outer end of the planetary sun gear (3). An oil passage (30) extends through the wear pad (26) and communicates between an interior of the housing (2) and an oil-filling port (32) during normal use. The plug (34) can be removed for checking the oil in the housing (2) without affecting the position of the wear pad (26).

17 Claims, 2 Drawing Sheets

(51) Int. Cl.
  *B60K 17/04* (2006.01)
  *F16H 57/08* (2006.01)
  *F16H 57/04* (2010.01)

(52) U.S. Cl.
  CPC ..... *F16H 57/0424* (2013.01); *F16H 57/0486* (2013.01); *F16H 57/08* (2013.01); *F16H 2057/0227* (2013.01)

(56) References Cited

U.S. PATENT DOCUMENTS

| | | | |
|---|---|---|---|
| 4,020,716 A | | 5/1977 | Toth et al. |
| 4,271,725 A | | 6/1981 | Takao et al. |
| 4,841,797 A | * | 6/1989 | Cerrington .......... F16H 57/0457 184/6.12 |
| 5,401,218 A | * | 3/1995 | Rassieur .............. B62D 55/125 180/9.62 |
| 9,683,651 B2 | * | 6/2017 | Fukasawa ............. F16H 57/043 |

\* cited by examiner

PLANETARY GEAR HUB ASSEMBLY

INTRODUCTION

This invention relates to a planetary gear hub assembly for use in vehicles.

BACKGROUND TO THE INVENTION

In a planetary gear hub assembly for a driven wheel in a vehicle independent suspension system, an input drive shaft is fitted with an articulating joint to enable the hub/wheel assembly to move relative to the axle differential assembly to which it is connected. The angular displacement of the jointed shaft creates axial loading on the planetary hub input drive shaft. In some cases because of space constraints, it is not feasible to fit a thrust bearing on the input end of the planetary sun gear input drive shaft. In such cases an arrangement comprising a thrust pad may be fitted at the sun gear end of the input drive shaft to react the axial thrust arising from the angulation of an input propshaft connected between the axle differential assembly and the input drive shaft. There are difficulties associated with the pre-setting of such arrangements to give and maintain satisfactory end float to the sun gear. An example of a known prior art arrangement of this type is shown in FIG. 1 which shows a prior art planetary gear hub assembly 1 comprising a housing 2, a planetary sun gear 3 rotatably mounted in the housing 2, the planetary sun gear 3 meshing with a set of planet gears 4, said planet gears 4 meshing with a ring gear 5, and a thrust bearing indicated generally by the reference numeral 6 on an end wall of the housing formed by an outer end cover 7 of the housing 2 for engagement by an outer end of the planetary sun gear 3. In this case the thrust bearing 6 comprises a thrust wear pad 8 forming an integral part of an oil-fill screw 9 mounted on the end cover 7. When the correct end float has been established by screwing in the oil-fill screw 9, an inner end of which also acts as the thrust pad 8, the oil-fill screw 9 is fixed in position by means of a locking nut 10. Another prior arrangement is shown in FIG. 2. A disadvantage of these known systems is that the correct adjustment may be lost for example when the oil-fill screw 9 is undone to check the hub oil level.

The present invention is directed towards overcoming these problems.

SUMMARY OF THE INVENTION

According to the invention, there is provided a planetary gear hub assembly including:
a housing,
a planetary sun gear rotatably mounted within the housing,
said planetary sun gear meshing with a set of planet gears,
said planet gears meshing with a ring gear,
a thrust bearing mounted on an end wall of the housing for engagement by an outer end of the planetary sun gear,
characterised in that the thrust bearing is formed by a wear pad mounted on an inner face of the end wall, an oil passage extending through the wear pad and communicating between an interior of the housing and an oil filling port extending through the end wall, and a plug demountably engaged with the oil filling port to close said oil filling port.

In one embodiment of the invention, the wear pad is adjustably mounted on the inner face of the end wall.

In another embodiment, the wear pad is adjustably mounted on the inner face of the end wall by means of one or more shims which are mounted between the wear pad and the inner face of the end wall to adjust the distance of a bearing face of the wear pad relative to the inner face of the end wall.

In another embodiment, an inner end of the wear pad is engagable within an associated mounting slot in the end wall.

In another embodiment, the inner end of the wear pad is a press-fit into engagement within the mounting slot.

In another embodiment, the inner end of the wear pad threadedly engages the mounting slot.

In another embodiment, the inner end of the wear pad is adhesively secured within the mounting slot.

In a further embodiment, the wear pad has a stepped body comprising an inner body portion which is engagable within the mounting slot and an enlarged head portion at an outer end of the inner body portion.

In another embodiment, the shims are engagable around the inner body portion and between an inner end of the head portion and the inner face of the end wall.

In another embodiment, a wear plug associated with and in alignment with the wear pad is mounted on the sun gear.

In a further embodiment, the wear plug is mounted in an axial bore in the sun gear.

In another embodiment, an inner end of the wear plug locates against a shoulder within the axial bore in the sun gear.

In another embodiment, the plug in the end wall comprises a bolt which extends through the port to threadedly engage the wear pad.

In another embodiment, the bolt threadedly engages with the oil passage in the wear pad.

In another embodiment, the end wall of the housing is formed by a removable cover.

In another embodiment, the planetary gear hub assembly is a planetary reduction hub assembly.

BRIEF DESCRIPTION OF THE DRAWINGS

The invention will be more clearly understood from the following description of some embodiments thereof, given by way of example only, with reference to the accompanying drawings, in which.

DETAILED DESCRIPTION OF PREFERRED EMBODIMENTS

Figure 1:
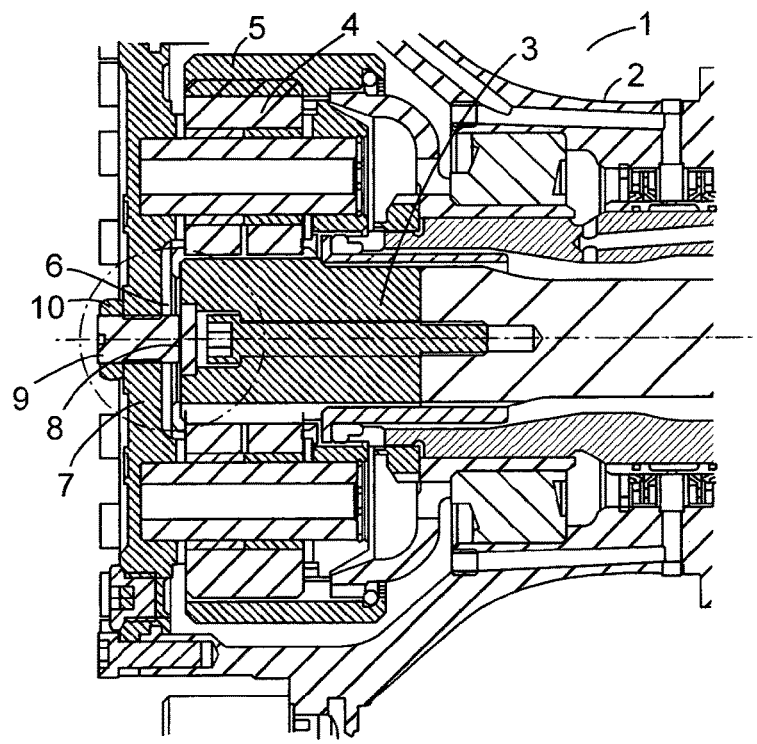
FIG. 1 is a sectional elevational view of a prior art planetary gear hub assembly.
Figure 2:
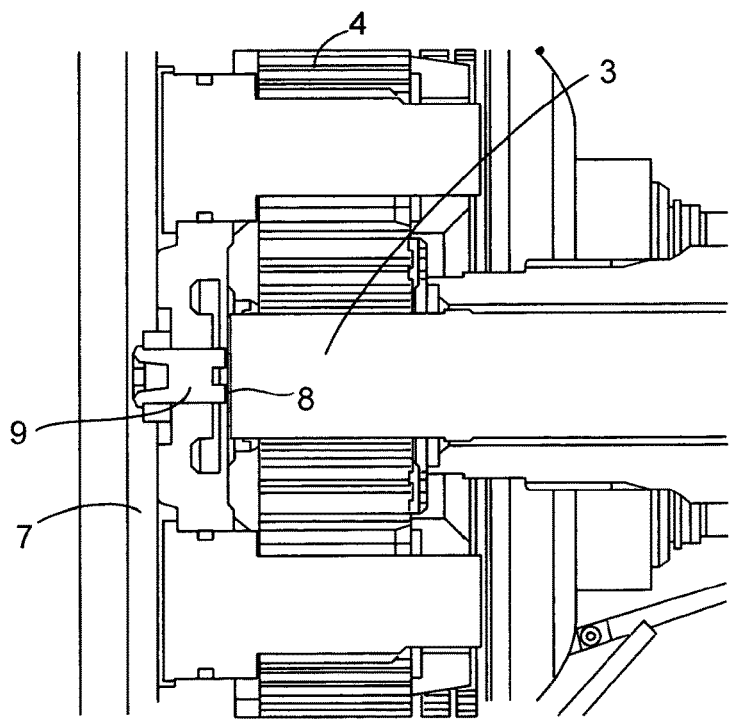
FIG. 2 is a sectional elevational view similar to FIG. 1 showing another prior art planetary gear hub assembly.
Figure 4:
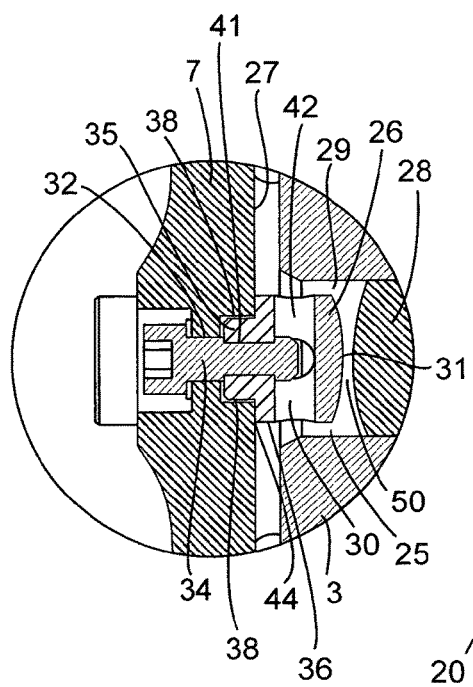
FIG. 4 is an enlarged detail sectional elevational view showing portion of the planetary gear hub assembly of FIG. 3.
Figure 3:
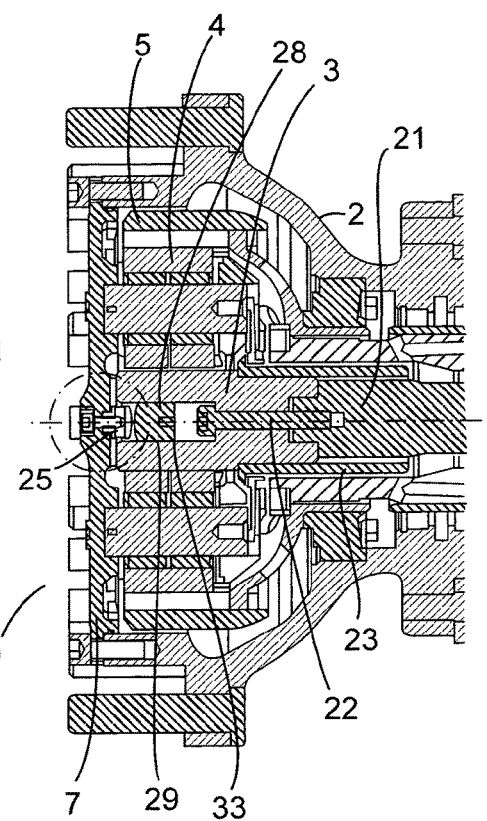
FIG. 3 is a sectional elevational view illustrating a planetary gear hub assembly according to the invention.

Referring now to FIGS. 3 and 4, there is illustrated a planetary gear hub assembly according to the invention indicated generally by the reference numeral 20. Parts similar to those described previously with reference to FIGS. 1 and 2 are assigned the same reference numerals. In this case the planetary gear hub assembly 20 is a planetary reduction hub assembly. The hub assembly 20 includes an input shaft 21 which is rigidly connected to the planetary sun gear 3 by means of a bolt 22 and a splined sleeve 23. An outer free end (not shown) of the input shaft 21 connects to an input propshaft which is connected between the planetary gear hub assembly 20 and an associated axle differential assembly on the vehicle upon which the planetary gear hub assembly 20 is mounted. A thrust bearing indicated generally by the reference numeral 25 is mounted on an end wall of the housing 2 formed by the end cover 7 of the housing 2 for engagement by an outer end of the planetary sun gear 3. In accordance with the present invention, the thrust bearing 25 is formed by a wear pad 26 mounted on an inner face 27 of the end cover 7 and an associated wear plug 28 mounted in a central axial bore 29 at the outer end of the planetary sun gear 3. An inner end of the wear plug 28 locates against a shoulder 33 within the axial bore 29.

Referring in particular to FIG. 4, an oil passage 30 extends through the wear pad 26 and communicates between an interior of the housing 2 and an oil-filling port 32 extending through the end cover 7. A plug 34 formed by a bolt is demountably engaged with the oil-filling port 32 to close the oil-filling port 32 during normal use.

The wear pad 26 has a stepped body comprising an inner body portion 35 and an enlarged head portion 36. The inner body portion 35 is engagable within an associated mounting slot 38 forming an enlarged inner portion of the central bore through the end cover 7 forming the oil-filling port 32. Means such as a light press-fit adhesive or other means are used to retain the inner body portion 35 within the slot 38.

It will be noted that the oil passage 30 extending through the wear pad 26 is T-shaped comprising a bore 41 extending through the inner body portion 35 in alignment with the port 32, said bore 41 connecting with a transverse hole 42 in the head portion 36 of the wear pad 26. The bore 41 is threaded to receive an inner end of the plug 34 which assists in retaining the wear pad 26 firmly against the inner face 27 of the end cover 7.

Shims 44 are engagable around the inner body portion 35 and between an inner end of the head portion 36 and the inner face 27 of the end cover 7 to provide adjustment of the wear pad 26. The distance between a bearing face 31 of the wear pad 26 and the inner face 27 of the end cover 7 can be adjusted by insertion of selected shims 44. The correct end float can be obtained by setting the distance 50 between the wear plug 28 and the wear pad 26 at the required amount by means of the shims 44 fitted behind the wear pad 26. One or more shims 44 are selected to a required thickness to provide the correct clearances at assembly of the hub 20.

In use, when checking the oil in the housing 2, the plug 34 is removed. It will be appreciated that this does not affect the position of the wear pad 26. The plug 34 is then replaced in the end cover 7 prior to re-use of the hub assembly 20.

The embodiment described with reference to FIG. 3 and FIG. 4 shows a hub arrangement where the sun gear is the input, the ring gear is fixed, and the planet gear/carrier is the output, thus giving a planetary reduction ratio (speed reduces, torque increases). However, it is envisaged that in some applications, an arrangement may be provided where the ring gear or the planet gears are the input and the sun gear is the output, which may in fact provide a speed increase.

Further, while a single stage planetary gear hub assembly has been described herein, it will be appreciated that the invention may also be applied to two-stage planetary gear hub assemblies.

The invention is not limited to the embodiments hereinbefore described which may be varied in both construction and detail within the scope of the appended claims.

The invention claimed is:

1. A planetary gear hub assembly comprising:
a housing,
a planetary sun gear rotatably mounted within the housing,
said planetary sun gear meshing with a set of planet gears,
said planet gears meshing with a ring gear,
a thrust bearing mounted on an end wall of the housing for engagement by an outer end of the planetary sun gear, the thrust bearing being formed by:
a wear pad mounted on an inner face of the end wall,
an oil passage extending through the wear pad and communicating between an interior of the housing and an oil filling port extending through the end wall, and
a plug demountably engaged with the oil filling port to close said oil filling port, said plug comprising a bolt which extends through the oil filling port to threadedly engage the wear pad.

2. The planetary gear hub assembly as claimed in claim 1, wherein the wear pad is adjustably mounted on the inner face of the end wall.

3. The planetary gear hub assembly as claimed in claim 2, wherein the wear pad is adjustably mounted on the inner face of the end wall by means of one or more shims which are mounted between the wear pad and the inner face of the end wall to adjust the distance of a bearing face of the wear pad relative to the inner face of the end wall.

4. The planetary gear hub assembly as claimed in claim 1, wherein an inner end of the wear pad is engagable within an associated mounting slot in the end wall.

5. The planetary gear hub assembly as claimed in claim 4, wherein the inner end of the wear pad is a press-fit into engagement within the mounting slot.

6. The planetary gear hub assembly as claimed in claim 4, wherein the inner end of the wear pad threadedly engages the mounting slot.

7. The planetary gear hub assembly as claimed in claim 4, wherein the inner end of the wear pad is adhesively secured within the mounting slot.

8. The planetary gear hub assembly as claimed in claim 4, wherein the wear pad has a stepped body comprising an inner body portion which is engagable within the mounting slot and an enlarged head portion at an outer end of the inner body portion.

9. The planetary gear hub assembly as claimed in claim 8, wherein shims are engagable around the inner body portion and between an inner end of the head portion and the inner face of the end wall.

10. The planetary gear hub assembly as claimed in claim 1, wherein a wear plug associated with and in alignment with the wear pad is mounted on the sun gear.

11. The planetary gear hub assembly as claimed in claim 10, wherein the wear plug is mounted in an axial bore in the sun gear.

12. The planetary gear hub assembly as claimed in claim 10 wherein an inner end of the wear plug locates against a shoulder within the axial bore in the sun gear.

13. The planetary gear hub assembly as claimed in claim 1, wherein the bolt threadedly engages with the oil passage in the wear pad.

14. The planetary gear hub assembly as claimed in claim 1, wherein the end wall of the housing is formed by a removable cover.

15. The planetary gear hub assembly as claimed in claim 1, wherein the planetary gear hub assembly is a planetary reduction hub assembly.

16. A planetary gear hub assembly comprising:
a housing,
a planetary sun gear rotatably mounted within the housing,
said planetary sun gear meshing with a set of planet gears,
said planet gears meshing with a ring gear,
a thrust bearing mounted on an end wall of the housing for engagement by an outer end of the planetary sun gear, the thrust bearing being formed by:
 a wear pad mounted on an inner face of the end wall;
 an oil passage extending through the wear pad and communicating between an interior of the housing and an oil filling port extending through the end wall;
a plug demountably engaged with the oil filling port to close said oil filling port; and
a wear plug associated with and in alignment with the wear pad being mounted on the sun gear, the wear plug being mounted in an axial bore in the sun gear, an inner end of the wear plug locating against a shoulder within the axial bore in the sun gear.

17. A planetary gear hub assembly comprising:
a housing,
a planetary sun gear rotatably mounted within the housing,
said planetary sun gear meshing with a set of planet gears,
said planet gears meshing with a ring gear,
a thrust bearing mounted on an end wall of the housing for engagement by an outer end of the planetary sun gear, the thrust bearing being formed by:
 a wear pad mounted on an inner face of the end wall, an inner end of the wear pad being threadedly engagable within an associated mounting slot in the end wall;
 an oil passage extending through the wear pad and communicating between an interior of the housing and an oil filling port extending through the end wall, and
a plug demountably engaged with the oil filling port to close said oil ling port.

\* \* \* \* \*